United States Patent [19]

Haschke et al.

[11] 3,992,343

[45] Nov. 16, 1976

[54] PROCESS FOR DISPERSING UNDISSOLVED SOLID, ORGANIC OR INORGANIC COLORANT PARTICLES

[75] Inventors: Heinz Haschke; Gerhard Morlock, both of Grossauheim; Horst Krüger, Darmstadt; Gerhard Hebbel, Traisa, all of Germany

[73] Assignee: Deutsche Gold- Und Silber-Scheideanstalt vormals Roessler, Frankfurt am Main, Germany

[22] Filed: July 24, 1973

[21] Appl. No.: 382,258

[30] Foreign Application Priority Data

July 26, 1972   Germany............................ 2236594

[52] U.S. Cl............................ 260/29.6 N; 252/310; 260/29.6 TA; 260/67 UA; 260/73 L
[51] Int. Cl.$^2$........................ C08G 2/00; C08J 3/20
[58] Field of Search........ 260/29.6 N, 67 UA, 73 L, 260/29.6 TA

[56] References Cited

UNITED STATES PATENTS

| | | | |
|---|---|---|---|
| 3,686,145 | 8/1972 | Haschke et al. | 260/67 U |
| 3,823,110 | 7/1974 | Epple | 260/73 L |
| 3,825,498 | 7/1974 | Altenschopfer et al. | 260/67 UA |

*Primary Examiner*—Eugene C. Rzucidlo
*Attorney, Agent, or Firm*—Beveridge, DeGrandi, Kline, Lunsford

[57] ABSTRACT

Process for dispersing solid, organic or inorganic colorant particles or mixtures thereof in a system comprised mainly of water by mixing into the aqueous system about 0.05 to 10% by weight of at least one dispersing agent comprising a polymer derived from specified units containing carboxyl, carboxylate, carbonyl and/or hydroxyl groups. A dispersing agent and an aqueous dispersion are provided. The process is particularly useful for dispersing pigments in aqueous systems.

11 Claims, No Drawings

PROCESS FOR DISPERSING UNDISSOLVED SOLID, ORGANIC OR INORGANIC COLORANT PARTICLES

This invention relates to a process for the dispersion of undissolved, finely divided inorganic and/or organic substances in systems comprised mainly of water.

The term "dispersing agent" generally designates substances, which facilitate the dispersion of difficult to dissolve, finely distributable substances — the dispersed substances or the dispersed phase — in a homogeneous, liquid medium — the dispersion medium — and thus facilitate the production of so-called disperse systems. They act as distributing agents, and as such, counteract or delay the (renewed) separation (sedimentation) of the dispersed substances (Internat. Lexikon "Textile Finishing and Border Areas," C. H. Fischer - Bobsien, Rhenus Handelsgesellschaft Ets., publishers Vaduz/FL 1966, 3rd Edition, P. 474; S. Glasstone "Textbook of Phys. Chem." 2nd Edition, Macmillan & Co., Ltd., St. Martin's Street, London, 1962 P. 1234 ff).

On the basis of today's generally accepted notions concerning the stabilization of disperse systems, or the physical-chemical foundations of dispersion activity, electrical boundary surface phenomena are considered to be responsible for the stability of such systems. The Helmholtz theory of the electric double layers, or its expansion by the Gouy-Chapman theory of the so-called "diffuse double layer", has contributed substantially to an understanding of the characteristics of disperse systems. According to these theories, the dispersing agent functions to produce or stabilize electric double layers at the phase boundary of the disperse phase/dispersion agent (O. Huber and J. Weigl, Weekly Paper For Manufacture of Paper 10 (1969), 359).

It is known that this function can be fulfilled, more or less, by certain electrolytic substances. Typical of such substances are polyphosphates, silicates, citrates, alkyl or arylsulfonates, lignin sulfonates, adipic acid derivatives and polycarboxylates. All of these known substances are accompanied by more or less serious disadvantages when used as dispersing agents.

Phosphates hydrolyze in aqueous systems — especially at elevated temperatures — relatively quickly to form low molecular weight, less effective or particularly ineffective phosphates (Kirk-Orthmer: "Encycl. Chem. Technol." 2nd Ed., vol. 15, P. 252 ff., Intersci. Publ., J. Wiley N.Y.: W. J. S. Laseur, Notes on Paper Manufacture, 14, 1971, 567 ff).

The effectiveness of silicates and citrates as dispersing agents is not very distinct. These compounds are therefore best used for special purposes, or as additives to dispersing agents. They have not found wide acceptance as dispersing agents.

A serious disadvantage of the alkyl or aryl sulfonates, the lignin sulfates and adipic acid derivatives is that they exhibit excessive surfactant characteristics. They are particularly concentrated at the boundary layers (predominantly aqueous) of the dispersion agent/gaseous phase, and therefore are inclined to form undesired foam in dispersion processes. Depending upon their functional groups, they often enter into a chemical reaction with the dispersed phase (e.g., some optical brightening agents).

The dispersing effect of the citrates depends greatly on the pH; i.e., they exhibit the desired dispersion activity only in the area around a neutral pH. Their effect diminishes very quickly, especially in the acid area.

The polycarboxylates known hitherto as dispersing agents are somewhat more stable in hydrolysis than the polyphosphates. Because of their relatively high molecular weight, they are considerably more difficult or cumbersome to put into solution. Further, they do not readily biodegrade. Thus, there is a danger that they will become organic pollutants in natural waters, and lead to a significant breakdown of the natural biological balance because of their continued dispersing effect.

Thus, there exists a need in the art for a more effective method of dispersing undissolved, finely divided inorganic and/or organic substances in systems comprised mainly of water. The method should involve the use of a dispersing agent which is effective in producing or stabilizing electric double layers at phase boundaries in the system. The dispersing agent used should aid in overcoming the aforementioned problems encountered with prior art dispersing agents.

Accordingly, this invention provides a process for dispersing at least one undissolved, finely divided inorganic substance, organic substance or mixture of inorganic and organic substances in systems comprised mainly of water. The process of this invention involves the use of about 0.05 — 10 weight percent based on the weight of the dispersed phase of a dispersing agent comprising at least one polymer having a mean degree of polymerization (numerical mean) of about 10 — 500. The polymer is derived from:

a. $Y + W/2 - 2Z$ mole percent of units of the general formula

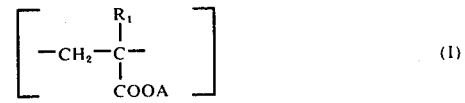

b. $U-W$ mole % of units of the general formula

c. $Z$ mole % of units of the general formula

d. $W/2$ mole % of units of the general formula

e. $V$ mole % of units of the general formula

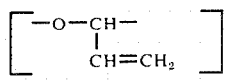

In the foregoing formulae, U is 12 – 47, V is 1 – 25, W is 0 (zero) – U, Y is [100–(U + V + Z)] and Z is 0 (zero) – 20. A signifies an alkali metal, hydrogen or ammonium ion. $R_1$ signifies hydrogen, methyl, hydroxymethyl, ethyl, chlorine or bromine. $R_2$ and $R_4$ are the same or different and signify hydrogen or hydroxymethyl. $R_3$ and $R_5$ are the same or different and signify hydrogen, methyl or ethyl. Further, when W is not equal to zero, then the quotient of mole % carboxylic or carboxylate groups to mole % hydroxyl groups is 2 – 16.

This invention is particularly suitable for dispersing inorganic and/or organic pigments as the undissolved, finely distributable inorganic and/or organic substances.

The term "pigments" as used herein is to be understood as substantially insoluble, solid, finely divided colorants according to Roempp "Chemie Lexikon," Vol. III (1966), col. 4935, in connection with ibid., Vol. II (1966), cols 1976 to 1983. Among these substances are the natural and synthetic inorganic pigments, metallic pigments, carbon pigments, natural organic pigments of animal or vegetable origin and synthetic organic pigments.

The aqueous systems used as the dispersion medium in this invention are comprised mainly of water; generally, the amount of water is at least about 70% by weight, preferably at least about 80% by weight. Aqueous systems comprising at least about 90% water by weight are particularly preferred. The systems can also include organic solvents in concentrations such that the solvents are completely miscible with water. Preferably, mixtures containing aliphatic mono- and/or multivalent alcohols are employed. Typical of such solvents are methanol, ethanol, n-propanol, isopropyl alcohol, glycol and glycerine.

Dispersion of the substances takes place generally at temperatures of about 0° – 100° C., preferably about 10° – 35° C.

The polymers used as dispersing agents in this invention polycarboxylates which contain, as functional groups, mainly carboxyl or carboxylate groups, and additionally carbonyl and/or hydroxyl groups. Depending on whether or not, and in what proportion, the polymers contain units of the above general formulas (II) and (IV), one is dealing with poly (aldehydo carboxylates) — for short PAC —, poly (hydroxy carboxylates) — for short POC —, or poly (hydroxyaldehydo carboxylates) — for short PAC or POC depending on their predominant character.

The polymers either do not have the above described disadvantages associated with the dispersing agents of the prior art, or have them only to a very limited degree. For example, the polymers are largely stable against hydrolysis even at greatly increased temperature, and their dispersing effects are largely independent of the pH of the system; they are effective over a very wide pH range. In the so called "closed bottle test" (GF-test) according to W. K. Fischer (Tensides 8, 4 (1971), 182 ff), the polymers employed in this invention exhibit G-F-test-biodegradation-rates after 30 days of experimentation between 20 and 40% expressed by the theoretical biochemical system oxygen requirement, depending on the average degree of polymerization of the polymers. The low molecular weight polymers (e.g., average degree of polymerization below about 40), exhibit substantially total capability for biodegradation. Under similar conditions, on the other hand, only values of 7 too 10% of the theoretical biochemical oxygen requirement will be achieved in the GF test after 20 days of experimentation with polyacrylates. Further, the polymers employed in this invention possess none of the surfactant characteristics which develop foam.

The polymers employed as dispersing agents in this invention are used in concentrations of about 0.05 – 10% by weight, preferably about 0.1 – 5% by weight, and especially about 0.1 – 2% by weight, related to the dispersed phase.

The average degree of polymerization of the polymers is about 10 – 500, preferably about 10 – 300, with about 20 – 100 being particularly preferred. The data concerning the average degree of polymerization is to be understood in such a way that the values 10, 20, 100, 300 or 500 correspond to a reduced viscosity as measured in a 1% solution of free poly(aldehydocarboxylic acids) of 0.047, 0.060, 0.095, 0.200 or 0.300 deciliter per gram. The 1% poly(aldehydocarboxylic acid) solutions needed for the measurement are prepared by treating the free poly(aldehydocarboxylic acids) with corresponding quantities of a 5 % aqueous $SO_2$ solution. After complete dissolution has occured one must fill up again with the same volume of 10% aqueous NaCl solution. The viscosity measurement takes place at 20° C. In the case of the poly(hydroxycarboxylates) and poly(hydroxyaldehydocarboxylates) the reduced viscosity of the poly(aldehydocarbonic acids) constituting their base is measured.

With respect to the dispersing agents of the prior art, it was known that the effectiveness of the agent was dependent upon the number of functional groups on the molecule capable of dissociation. (For example, polyphosphates are better dispersing agents than orthophosphates, and polyacrylates are far superior as dispersing agents to citrates and gluconates). In view of this fact, it is surprising that the polymers employed in this invention are useful as dispersing agents and are more effective, depending upon their use, than polyacrylate dispersing agents, since functional carboxylate groups are partially replaced by aldehyde or hydroxymethyl groups not capable of dissociation.

Furthermore, the polymers used in this invention are capable of forming water soluble complexes with metal ions over a wide concentration and pH range. These complexes exhibit good stability. As a result, the polymers employed in this invention obviate the adverse effects which might result in metal ions are present in the dispersing agent and/or substance to be dispersed (e.g., discoloration, formation of deposits and sensitation effects). The ability to form complexes with metal ions is possibly the reason for the superiority of the dispersing agents employed in this invention in comparison with the dispersing agents of the prior art, at least when used with many inorganic dispersed phases (e.g., $CaCO_3$ and CdS). Further, a better (chemi)sorption of the dispersing agent on the surface of the dispersed phase is assured.

The units having the general formulas (I) to (V) making up the polymers employed in this invention are given in basic mole percent according to E. Trommstorff, i.e, as the average number of the pertinent formula units per 100 formula units (I) to (V) in the polymer molecules.

Among the parameters (U, V, W, Y and Z) which define the number of units of the general formulas (I) to (V) in the polymers, U is about 12 – 47, preferably about 20 – 47, especially about 22 to 47; V is about 1 – 25, preferably about 5 – 20, especially about 5 – 15; W is about 0 (i.e., zero) – U, preferably about 0.3 U to about U, especially about 0.5 U to about U; Y is about [100 – (U + V + Z)] and Z is about 0 (i.e., zero) – 20, preferably about 0 (i.e., zero) – 10, especially about 0 (i.e., zero).

Furthermore, for polymers in which W is not equal to 0, which therefore contain units of the general formula (IV), the quotient of mole percent carboxyl groups or carboxylate groups divided by mole percent hydroxyl groups is 2 – 16, preferably 3 – 9, especially 4 – 8.

Among the polymers employed in this invention, the poly (hydroxycarboxylates), i.e., polymers for which W is practically equal to U, and which therefore have no or at most a very small portion of units of the general formula (II), are particularly favored, since they are superior with regard to effectiveness as dispersing agents, oxidation, temperature and light resistance, as well as chemically inert behavior as compared to the substances that are to be dispersed. The poly (aldehydocarboxylates), i.e., polymers for which W is practically equal to zero, which therefore have no or only a very small portion of units of the general formula (IV), are less preferred. Poly (hydroxyaldehydocarboxylates) i.e., polymers, which contain units of the general formula (II) as well as units of the general formula (IV), generally assume a middle position.

The preparation of the polymers used in this invention can be accomplished according to known methods. Thus, the poly (aldehydocarboxylates) can be produced particularly favorably, above all in view of their suitability as dispersing agents, by oxidative polymerization of acrolein, or by oxidative copolymerization of acrolein with acrylic acid, methacrylic acid, ethacrylic acid, α-chloroacrylic acid or α-bromoacrylic acid, or by oxidative terpolymerization of acrolein with the above mentioned α,β-unsaturated monocarboxylic acids and α,β-unsaturated dicarboxylic acids optionally substituted by methyl groups of ethyl groups. The polymerization conditions as selected are such that the proportions of the polymer of units of the general formula (I), (II), (III) and (V) lie within the stated ranges, and the required degree of polymerization is maintained. Peroxides and peracids can be used as oxidizing agents and at the same time as polymerization initiators. Preferably $H_2O_2$ is used. The COOH- and CO-content of the polymers can be adjusted in the oxidative polymerization by the quantities of, for example, acrolein, acrylic acid and oxidation agent employed. Since the peroxide compound acts simultaneously as a regulator, it is possible to influence the degree of polymerization by controlling its concentration relative to the monomer.

The terminal groups of the polymer can be hydroxyl groups, carboxyl groups, carbonyl groups, $CH_2OH$-groups and semi-acetalic groups of the type:

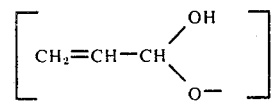

The terminal groups can also be vinyl groups or hydrogen atoms, for example in the form of the groups of the type:

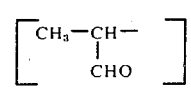 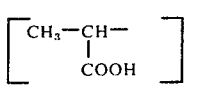

Further, radicals of the catalyst used can occur as terminal groups. The terminal groups are not critical to the use of the polymers according to this invention.

The homo- or copolymerization of acrolein can be carried out and is conducted in a manner dependent upon the carboxyl group content desired in the polymer. Either solution or precipitation polymerization, preferably in an aqueous medium, can be employed. When using peroxidic compounds as oxidizing agents, it is recommended that the latter be added to a reactor, optionally with the comonomer or a part of it in an aqueous solution or suspension, and then the acrolein added, possibly mixed with the remaining comonomers, at an elevated temperature of, for example, about 50° – 100° C.

In case of solution polymerization, the polymers obtained, optionally after concentration of the solution, can be used directly in further reactions. It often is desirable to deactivate any of the oxidizing agent remaining in the solution, such as by the addition of a small quantity of $MnO_2$ or activated charcoal. It is also possible to precipitate the polymers from their solutions with the aid of a dilute acid, such as hydrochloric acid.

Residual monomers can be recovered from the reaction mixture, e.g., by distillation. In this instance, the distillation residue is a highly concentrated aqueous solution of the polymer which can be subjected to additional reaction if desired. The distillation can also be carried out to dryness, in which case, the polymer is obtained in solid form.

When carrying out a precipitation polymerization, the polymers can be separated easily by filtration. The residual monomers are then contained in the filtrate, and can be reused in that form. The precipitation polymers can be further purified with water, and optionally by conducting air through the polymers.

The units of the type (II) can also be present in the poly (aldehydocarboxylates) in wholly or partly hydrated form or as cyclic structures resulting from reactions with the adjacent groups. Cyclic, acetalic and acylalic structures which develop are:

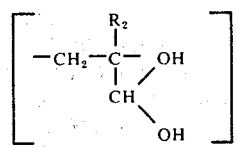

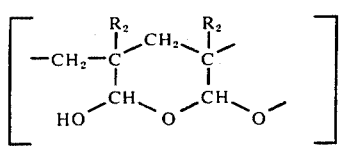

(IIb)

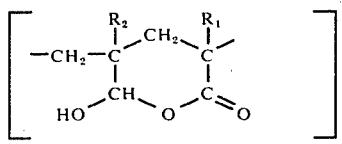

(IIc)

These special structures are in a readily reversible equilibrium with the simple, open carbonyl structure (II) and have no special significance when employed in this invention.

When the poly (aldehydocarboxylic acids) produced according to the above mentioned process are neutralized with an alkali metal hydroxide or with ammonia, the corresponding poly (aldehydocarboxylates) are obtained in which A can have the previously mentioned meanings other than hydrogen.

The preparation of the poly (hydroxyaldehydocarboxylates) and poly (hydroxycarboxylates) employed in this invention can also be accomplished according to known techniques. Further, polymers which were made by the oxidative polymerization of acrolein or by the oxidative copolymerization of acrolein into the previously described poly (aldehydocarboxylates) can be converted into the poly (hydroxyaldehydocarboxylates) or poly (hydroxycarboxylates) by subsequent treatment of the polymerizates with a strong base, especially with an alkali metal hydroxide according to the Cannizzaro reaction. The treatment with a strong base can also take place with simultaneous condensation of formaldehyde. There will then be obtained polymers which additionally have units of the general formula:

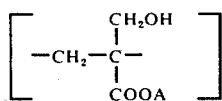 and 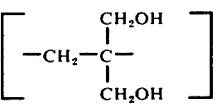

These units correspond to the general formulas (I) and (IV) when $R_1$ and $R_4$ are each hydroxy methyl. Whenever the treatment of the poly (aldehydocarboxylates) with a strong base according to Cannizzaro is continued to a complete conversion of all of the units of the general formula (II) originally present, then poly (hydroxycarboxylates) result; if it is carried out only to partial conversion then poly (hydroxyaldehydocarboxylates) are obtained.

The poly (aldehydocarboxylic acids) initially obtained, can be reacted with a strong base in an aqueous solution, optionally in the presence of formaldehyde. In this case, it is possible to add the formaldehyde in about stoichiometric quantities to the aldehydic groups present in the polymer, and subsequently stir it for some time at ambient temperature, or at elevated temperatures up to about 100° C., preferably at 20° to 60° C., while gradually adding alkali. After about two hours, the conversion is from about 60 to 70% of theoretical, and can rise within 24 hours to 90 – 100% of theoretically complete conversion. In a solution reaction, there results a solution containing an excess of alkali in addition to the salts of the poly (hydroxyaldehydocarboxylic acids) or poly (hydroxycarboxylic acids). They can be evaporated to dryness. By precipitation from the reaction medium, e.g., with methanol, salts are obtained in a particularly pure form. It is also possible prior to concentration to neutralize the solution with a dilute acid, e.g, hydrochloric acid or preferably formic acid, sulfuric acid or phosphoric acid, or to precipitate the free acids.

Excess alkali should only be neutralized with acids, the salts of which do not interfere with the use of the polymers in accordance with this invention. The use of, for example, carbon dioxide, hydrochloric acid, sulfuric acid, phosphoric acid, formic acid or acetic acid is recommended for this purpose. But it is also advantageous to use for this the poly (hydroxyaldehydocarboxylic acids) or poly (hydroxycarboxylic acids) themselves in a pure solid form or in solution. According to a particularly preferred embodiment, the poly (aldehydocarboxylic acid) obtained as an intermediate product in the above reaction is used; preferably the type readily soluble in water and used in an aqueous solution or in solid form. In this manner, neutral solutions of the salts of the poly (hydroxyaldehydocarboxylic acids) or poly (hydroxycarboxylic acids) are obtained, which can be used directly. In the main chain they have mostly C—C-bonds, and they can be either straight chain or cross-linked. The polymers are built-up from at least two of the above mentioned units (I) to (V). These units are developed partly during the treatment of the poly (aldehydocarboxylic acids) according to the Cannizzaro reaction. In the case of this reaction however, intermolecular aldol condensation reactions can occur between the active CH- groups in a position alpha to the aldehydic groups in the poly (aldehydocarboxylic acid) and the carbonyl groups of one or more adjacent chains. As a result, cross linking occurs. The above mentioned units (I) and (IV) as well as possibly (II) and (III), are indispensable for the use of these polymers as dispersing agents.

Units derived from comonomers other than acrolein or acrylic acids can be present in subordinate numbers in the main polymer chain. Typical of other comonomers is maleic acid which leads to units (III). They can be present in amounts up to about 20 basic mole percent. The solubility in water and/or the acidity, and thus the general useability of the polymers can be controlled by the selection of the comonomers.

Whenever the conversion of the poly (aldehydocarboxylate) is carried out with a strong base according to Cannizarro in the presence of formaldehyde, units of the general formulas (I) and (IV) will form, in which $R_1$ and $R_4$ represent hydroxymethyl groups; the degree of crosslinking can be controlled by the quantity of aldehyde used.

Although the oxidative polymerization or copolymerization of acrolein is a radical polymerization, units of the general formula (V) can be present in subordinate quantities up to about 25 basic mole percent in the main chains of the poly (aldehydocarboxylates), and also the poly (hydroxyaldehydocarboxylates) or poly (hydroxycarboxylates) produced from it by the Cannizarro reaction. They develop as a result of polymerization with opening of the carbonyl double bond of the acrolein. With regard to the suitability of the polymers as dispersing agents, they are of no consequence, but they have a certain (positive) influence on the biological decomposition of the polymers.

The terminal groups present in the polymer are also practically without significance, and develop depending upon the reaction conditions and the reaction medium. When acrolein and $H_2O_2$ are used, generally at least one of the two terminal groups is always a hydroxyl group. In all other cases, the terminal groups are generally CHO—, $CH_2OH$—, COOH— or $CH_2=CH$— groups or hydrogen atoms, as well as radicals of the catalyst used.

Since the free acids used according to this invention are very weak acids, aqueous solutions of their salts have more or less high pH values lying in the alkaline range. Beyond that, these substances as polyelectrolytes show the peculiarity, that — contrary to the classic, simple electrolytes — they do not dissociate completely into their ions at all levels of concentration in aqueous solutions ["Primary Dissociation" — J. Am. Chem. Soc. 72 (1950), 2636]. Consequently, in the dilution of such polyelectrolyte - salt solutions, the primary dissociation effects prevail. As a result, additional carboxylate groups are freed, which, as anion bases, give rise in the hydrolysis equilibrium to a rise in the pH, and only lead to a pH drop after complete primary dissociation corresponding to the behavior of classical, simple electrolytes according to (Oswald's) law of dilution.

The corresponding partial salts of the poly (aldehydocarboxylic acids), poly (hydroxyaldehydocarboxylic acids) or poly (hydroxycarboxylic acids) can also be used advantageously according to this invention. Therefore, the compounds representing so called "hydrogen salts" can be used according to this invention.

The undissolved finely divided, inorganic and/or organic substances that are to be dispersed according to this invention will be understood to include solid, finely divided colorants which are practically insoluble in the dispersion or suspension agent, or only little soluble in it. That is, there are to be included substances, the optical refractive index and/or the light absorption or remission of which (in the visible spectral range and/or in the so called near ultraviolet range) differ clearly from the optical refractive index or the light absorption and/or remission of the dispersing agent. Typical of such substances are the following: Natural inorganic pigments, such as natural mineral colors, therefore substances which are obtained by mechanical treatment such as grinding, washing, drying of raw mineral products, e.g., chalk, marble, ocher, umber, vermillion, green earth, burned terra di Siena, china clay, gypsum, kaolin, white lead, zinc oxide (zinc white), titanium white, talcum, satin white; synthetic inorganic pigments obtained by chemical or physical conversion of inorganic basic substances, such as by precipitating or annealing to e.g., chrome yellow, red lead, iron oxide, cadmium and chromium pigments, cobalt blue, Paris blue, ultramarine, white pigments such as lead carbonate, zinc carbonate, barium sulfate, silicic acid; metallic pigments, e.g., bronzes, silver, gold; natural organic pigments such as sepia, rubber yellow, gelb-gum, Cassel brown, indigo, purple; synthetic organic pigments: such as phthalocyanines, so called tar-colors, so called optical brighteners, polymers and/or elastomers which fulfill the above mentioned conditions.

The optical whitening agents that are dispersable with the polymers to be used according to this invention are mostly, even though not exclusively, derivatives of diaminostilbene sulfonic acids, diaryl pyrazolines and amino coumarines.

Examples of whitening agents from the class of diaminostilbene sulfonic acid derivatives are compounds of the formula:

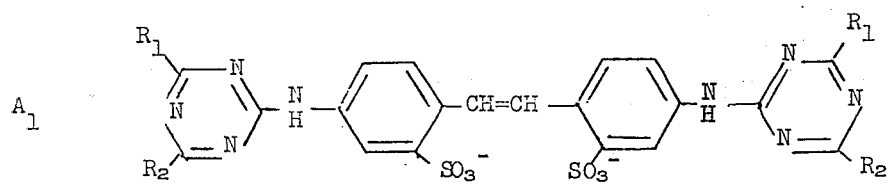

In this formula, $R_1$ and $R_2$ signify halogen atoms, alkoxyl groups, an amino group or radicals of aliphatic, aromatic or heterocyclic primary or secondary amines as well as radicals of amino sulfonic acids, whereby aliphatic radicals present in the above groups contain preferably 1 - 4, and especially 2 - 4 C-atoms. In the case of the heterocyclic ring systems, they are mostly 5 or 6 membered rings. The radicals of an amine, of anthranilic acid or of aniline sulfonic acid are typical aromatic amines. Whitening agents derived from diamino stilbene sulfonic acid are used mostly as cotton bleaches. Products derived from Formula $A_1$ are on the market, in which $R_1$ represents the radical — $NH—C_6H_5$ and $R_2$ can signify the following radicals:

—$NH_2$

—NH—$CH_3$

—NH—$CH_2$—$CH_2OH$

—NH—$CH_2$—$CH_2$—O—$CH_3$

—NH—$CH_2$—$CH_2$—$CH_2$—O—$CH_3$ $CH_3$—N(—$CH_2$—$CH_2$ OH)

—N = ($CH_2$ — $CH_2OH$)$_2$ morpholino—

—NH—$C_6$—$H_5$

—NH—$C_6H_4$—$SO_3H$

—$OCH_3$.

A few of these brighteners are to be considered as transition types to the polyamide brighteners in regard to their affinity for fiber, e.g., the brightener with $R_2 =$ —NH—$C_6H_5$. The compound 4,4'— (-4-phenyl — vicinal-triazolyl-2-) -stilbene disulfonic acid -2,2' is typical of the cotton bleaches of the diamino stilbene sulfonic acid type.

To the polyamide whitening agents, a few of which have a certain affinity to cotton fibers, belong diarylpyrazolines of the formulas $A_2$ and $A_3$:

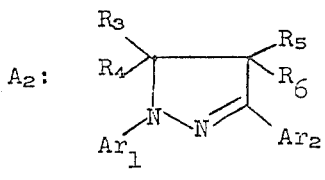
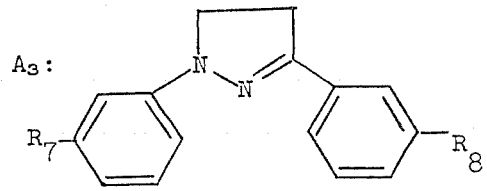

In the formula $A_2$, $R_3$ and $R_5$ signify hydrogen atoms, possibly alkyl or aryl radicals substituted by carboxyl, carbonamide or ester groups; $R_4$ and $R_6$ are hydrogen or short chained alkyl radicals $Ar_1$, as well as $Ar_2$ are aryl radicals such as phenyl, diphenyl or naphthyl, which can carry further substituents such as hydroxy, alkoxy, hydroxyalkyl, amino, alkylamino, acylamino, carboxyl, carboxylic acid ester, sulfonic acid, sulfonamide and sulfone groups or halogen atoms. Brighteners of the type on the market derived from formula $A_3$ are known whereby the radical $R_7$ represents the groups $-Cl$, $-SO_2-NH_2$, $-SO_2-CH = CH_2$ and $-COO-CH_2-CH_2-O-CH_3$ while the radical $R_8$ in all cases signifies a chloratom. The 9-cyano-anthracene is also on the market as a bleach.

Further, the polyamide brighteners include aliphatic or aromatic substituted amino coumarines, e.g., 4-methyl-7-dimethyl amino- or 4-methyl-7-diethyl amino coumarine. Furthermore, the compounds 1-(benzimidazolyl-2')-2- (N-hydroxyethyl-benzimidazolyl-2')-ethylene and 1-N-ethyl-3-phenyl-7-diethylaminocarbostyril are usable as polyamide bleaches. As bleaches for polyester or polyamide fibers, the compounds 2,5-di-(benzoxazolyl-2') - thiophen and 1,2-di-(5'-methyl-benzoxazolyl-2')-ethylene can be used.

The expression "finely distributable substances" is to be understood in such a way, that the average particle diameters, expressed in $\mu$, of the particles of the substance to be dispersed is smaller than or equal to the value $$d_{max.} = \frac{a}{\sqrt[3]{|\rho_T - \rho_D|}}$$

whereby the parameter $a$ has the value 15, preferably 10, especially 4, and $\rho_T$ or $\rho_D$ stands for densities (in grams per cm$^3$) of the particles to be dispersed and of the dispersing agent, respectively. Further, the following boundary condition should be satisfied: that for $|\rho_T - \rho_D| < 0.0027$ the value of $d_{max.} = 20$, preferably $d_{max.} = 10$, especially $d_{max.} = 5$.

The polymers employed in this invention are used as dispersing agents in concentrations of 0.05 – 10% by weight, preferably 0.1 – 5% by weight, especially 0.1 – 2% by weight, related to the disperse phase (the weight of dispersed substance). It is recommended that the dispersing agent first be added to the dispersant (dissolved in it), and then to disperse the finely divided substance in the resulting solution. Distribution of the substance to be dispersed can be accomplished by simple mechanical dispersion (e.g., with the aid of stirring mechanisms, kneaders, Ultraturrax, ultrasonics etc.,) or else by formation of the substance to be dispersed in or from the dispersion medium as a result of chemical reactions by addition of suitable reactants or by adjustment of chemico-physical conditions.

Naturally it will be particularly advantageous to carry out the dispersion with intensive (mechanical) mixing of the dispersion medium containing the dispersing agent and the substance to be dispersed, since it will then be possible to develop a proper double layer. Frequently, the predominantly aqueous dispersant will only then moisten the particles — particularly hydrophobic particles — of the substance to be dispersed. If a further reduction in size of the particles to be dispersed occurs during mechanical intermixing of the dispersion medium and substance to be dispersed, then that is naturally of an advantage to the dispersion process or for the stability of the dispersion obtained.

The polymers employed in this invention can be used by themselves, or in combination with the known dispersing agent or dispersing agent additives. The process according to this invention for the dispersion of inorganic and/or organic pigments in systems comprised mainly of water will be explained by the following examples in which all ratios, proportions, parts and percentages are by weight unless otherwise indicated.

EXAMPLE 1

A test for comparative purposes is conducted by adding 90 ml distilled water to a 250 ml beaker. $10_g$ of cadmium sulfide (average particle size 3 – 5$\mu$) are added to the water over a period of about 1 minute while stirring (noble metal-paddle stirrer, 550 rpm). Stirring is continued for another 15 minutes. The suspension obtained is poured immediately into a 100 ml measuring cylinder.

A dispersion test is conducted subsequeuntly in a manner analogous to the comparative test, with the exception that prior to the addition of the pigment to the water, 5 ml of a 1% POC-Na-salt solution (corresponding to 0.5%, relative to the quantity of pigment to be dispersed) are pipetted in. Whereas, after 5 minutes of standing in the measuring cylinder, the comparative test suspension had largely settled (the supernatant liquid appear only slightly turbid to almost clear), no noticeable sedimentation is found after 15 minutes of standing of the dispersion produced with the POC-Na-salt.

An evaluation is made according to the following 10 - step scale.

| Value | Sedimentation | Supernatant Liquid |
|---|---|---|
| 1 | Absolutely none | Absolutely homogeneous |
| 2 | Practically none | Homogeneous (meniscus clear) |
| 3 | Just determinable | Homogeneous to somewhat clear to 5 ml below meniscus |
| 4 | Determinable | Homogeneous to somewhat clear to 5 ml below meniscus |
| 5 | Clearly determinable | Homogeneous to clear to 5 ml below meniscus |
| 6 | Clearly determinable | Meniscus to 10 ml below that appears clear |
| 7 | Clearly determinable | Meniscus and also below it - to more than 10 ml - appears clear |
| 8 | Clear, strong | Meniscus and also below it - to 20 ml - appears clear |
| 9 | Large, practically complete | Almost clear, only little residual dispersion |
| 10 | Complete | Clear |

The comparative test, after visual evaluation, is given a value of 9; the dispersion with the POC-Na-salt is given a value of 1 to 2. The same values result after 30 minutes of standing time; after standing for 16 hours, the values are: comparative test value: 9 – 10, dispersion with the POC-Na-salt: 4.

Th POC-Na-salt used was prepared by oxidative copolymerization of 50 mole % acrolein with 50 mole % acrylic acid in 20% by weight aqueous $H_2O_2$ (0.9 moles $H_2O_2$ per mole acrolein) at 65° C., followed by Cannizarro reaction and neutralization with a radical of the oxidative copolymer. The salt is characterized by the parameters: average degree of polymerization = 60, COO— :OH— ratio: 7.7 (with consideration of the terminal groups); $U = 18$, $V = 4$, $W = 17.5$, $Y = 78$ and $Z = 0$.

EXAMPLE 2

The experiment of Example 1 is repeated, but with the use of 0.7% relative to the dispersed cadmium sulfide, of a PAC-Na - salt produced by oxidative copolymerization of 50 mole % acrolein and 50 mole % acrylic acid in aqueous, 20% by weight $H_2O_2$ (0.9 moles $H_2O_2$ per mole acrolein), at about 60° C. and with subsequent neutralization. The PAC-Na-salt is characterized by the parameters: average degree of polymerization = 60, $U = 18$, $V = 4$, $W = 3$, $Y = 78$ and $Z = 0$.

Evaluation according to the aforementioned scale yields the following results:

| After t mins. | Comparative test | PAC-Na - salt dispersion |
|---|---|---|
| 5 | 9 | 1 – 2 |
| 30 | 9 | 1 – 2 |
| Standing overnight | 9 – 10 | 4 |

EXAMPLE 3

A test for comparative purpose is conducted by adding 180 ml of distilled water to a 250 ml beaker. $20_g$ of aluminum oxide having an average particle size of $3\mu$ are stirred into the water with a high speed stirring apparatus ("Ultraturrax" of the firm of Janke and Kunkel; 10,000 rpm). After addition of all of aluminum oxide (within about 30 seconds), stirring is continued for yet another minute, and then the suspension is transferred immediately into a 100 ml measuring cylinder (the excess suspension residue is thrown away).

An aluminum oxide dispersion is produced in the same manner, but with the difference that prior to mixing the aluminum oxide into the water, 400 mg of POC-Na salt are dissolved in the water (corresponding to 2% dispersing agent relative to the quantity of aluminum oxide). While the comparative test suspension has a value of 8 (according to the scale mentioned in Example 1) after standing 5 minutes, the dispersion produced with the POC-Na salt receives a value of 1. After 30 minutes standing time, the comparative test has a value of 9, and the POC-Na-salt dispersion a value of 1 – 2.

The POC-Na salt used in the production of the dispersion is characterized by the parameters: average degree of polymerization = 60, COO⁻: OH ratio = 5.8, while also considering the terminal groups); $U = 16.7$; $V = 3.4$; $W = 8.0$; $Y = 79.9$ and $Z = 0$.

EXAMPLE 4

In an experiment analogous to Example 3, aluminum oxide dispersions are produced with the same $Al_2O_3$ pigment as described in Example 3, but with a different POC-Na-salt as dispersing agent, and on the one hand, 10% by weight (test variation a) and then only 0.1% by weight (test variation b) of the dispersing agent, relative to the quantity of dispersed pigment.

The test results are summarized in the following table using the evaluation scale given in Example 1:

| Standing time of the dispersion | Comparative test | Evaluation after Standing time | |
|---|---|---|---|
| | | Variation a | Variation b |
| 5 minutes | 8 | 1 – 2 | 1 – 2 |
| 30 minutes | 9 | 1 – 2 | 1 – 2 |

The POC-Na salt used in the production of the aluminum oxide dispersion is characterized by the following data: Average degree of polymerization = 12; COO⁻: OH ratio =3.2 (also taking the terminal groups into consideration); $U = 24.5$, $V = 11.0$, $W = 22.5$, $Y = 64.5$ and $Z = 0$.

EXAMPLE 5

In an experiment analogous to Example 3, there is prepared a 10% by weight dispersion of barium sulfate from commercial barium sulfate (average particle size $3\mu$). Besides a comparative test (without dispersing agent), 1% by weight (variation a) and 0.1% by weight (variation b) of a POC-Na-salt is used as dispersing agent. The polymer described in Example 3 is used as POC-Na salt.

An evaluation of the dispersions is again made in accordance with the scale given in Example 1:

| Standing time of the dispersion | Comparative test | Evaluation after Standing time | |
|---|---|---|---|
| | | Variation a | Variation b |
| 5 minutes | 9 | 1 – 2 | 1 – 2 |
| 30 minutes | 9 | 2 | 2 |
| Overnight | 9 | 2– 3 | 2 – 3 |

EXAMPLE 6

In an experiment analogous to Example 1, a 15% by weight dispersion of an optical brightner (whitening agent) is prepared. The pigment — i.e., the optical brightener — is a commercial dye, chemically characterized as a heterocyclic derivative of stilbene disulfonic acid (cf. pp. 19 –20) with the designation "Blancophor CL." Prior to use, the product is extracted for several hours with water and subsequently with chloroform then again with water, in order to remove possible impurities. Beside the comparative test (without dispersing agent) an experiment is conducted with 1% by weight POC-Na salt, relative to the quantity of pigment. The same polymer described in Example 1 is used as the POC-Na salt.

Following the scale mentioned in Example 1, the results of the tests are as follows: Comparative test after 30 minutes standing time: 4

| | |
|---|---|
| Comparative test after 30 minutes standing time: | 4 |
| Experiment with POC-Na after 30 minutes: | 1 – 2 |
| Comparative test after standing overnight: | 5 – 6 |
| Experiment with POC-Na after standing overnight: | 2 |

EXAMPLE 7

In an experiment analogous to Example 6, a 15% by weight dispersion of another commercial optical whitening agent (pyrazolin derivative with the designation "Blancophor DCB") is prepared after purification of the raw pigment as described in Example 6. However, differeing from the method of production of the dispersion as given in Example 6, the pigment was stirred into hot water of 80° C. rather than water at ambient temperature. In the experiment according to this invention, the water contains the corresponding quantity of (0.3% by weight POC-Na-salt, related to the quantity of pigment) dispersing agent in solution. The dispersions prepared in this way are allowed to cool after being poured into a measuring cylinder. The following values result:

| | |
|---|---|
| Comparative test after 30 minutes: | 5 |
| Experiment with POC-Na-salt after 30 minutes: | 1 – 2 |
| Comparative test after standing overnight: | 8 |
| Experiment with POC-Na-salt after standing overnight: | 3 |

As used herein, the expression "alkali metal" is intended to mean a metal selected from Group IA of the Periodic Table of the Elements.

As previously described, this invention enables the dispersion of undissolved, finely divided inorganic substances, or organic substances or mixtures of such substances in systems comprised mainly of water. As used herein, the term "undissolved" is intended to mean that the substance and/or substances are substantially insoluble in water.

What is claimed is:

1. Process for dispersing solid, organic or inorganic colorant particles or mixtures thereof in a system comprised mainly of water, said process comprising adding to said system about 0.05–10% by weight of a dispersing agent, related to the weight of said particles, said dispersing agent being at least one polymer having an average degree of polymerization of about 10–500, said polymer derived from;

a. Y + W/2 mole percent units of the general formula

b. U-W mole percent units of the general formula

c. W/2 mole percent units of the general formula

 (IV) and d. V mole percent units of the general formula

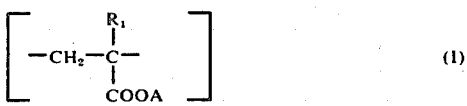

in which U is 12–47, V is 1–25, W is O–U, and Y is [100–(U+V)]; A is an alkali metal, hydrogen or ammonium ion; $R_1$ signifies hydrogen, methyl, hydroxy methyl, ethyl, chlorine or bromine; $R_2$ and $R_4$ are the same or different and signify hydrogen or hydroxymethyl; and whereby for W unlike zero, the quotient of mole percent carboxyl or carboxylate groups to mole percent hydroxyl groups is about 2–16.

2. A homogeneous dispersion consisting essentially of solid, organic or inorganic colorant particles or mixtures thereof uniformly dispersed in water, and about 0.05–10% by weight of a dispersing agent, related to the weight of said particles, said dispersing agent being at least one polymer having an average degree of polymerization of about 10–500, said polymer derived from:

a. Y + W/2 mole percent units of the general formula

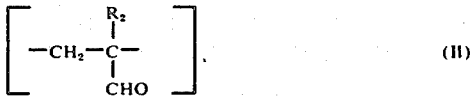

b. U-W mole percent units of the general formula

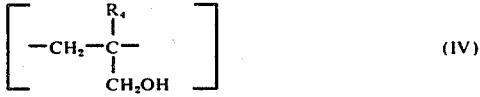

c. W/2 mole percent units of the general formula

d. V mole percent units of the general formula

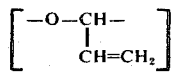

in which U is 12–47, V is 1–25, W is O–U, and Y is [100–(U+V)]; A is an alkali metal, hydrogen or ammonium ion; $R_1$ signifies hydrogen, methyl, hydroxy methyl, ethyl, chlorine or bromine; $R_2$ and $R_4$ are the same or different and signify hydrogen or hydroxymethyl; and whereby for W unlike zero, the quotient of mole percent carboxyl or carboxylate groups to mole percent hydroxyl groups is about 2–16.

3. Process according to claim 1 in which the dispersing agent is about 0.1 – 5% by weight related to the disperse phase.

4. Process according to claim 1 in which the dispersing agent is about 0.1 to 2% by weight related to the disperse phase.

5. Process according to claim 1 in which the average degree of polymerization is about 10 – 300.

6. Process according to claim 1 in which the average degree of polymerization is about 20 – 100.

7. Process according to claim 1 in which U is 20–47, V is 5–20, and W is about 0.3U to about U.

8. Process according to claim 1 in which U is 22–47, V is 5–15, and W is about 0.5U to about U.

9. Process according to claim 1 in which A is a sodium ion.

10. Process according to claim 1 in which for W unequal to zero, the quotient of basic mole percent carboxyl or carboxylate groups to basic mole percent hydroxyl groups is 3 – 9.

11. Process according to claim 1 in which for W unequal to zero, the quotient of basic mole percent carboxyl or carboxylate groups to basic mole percent hydroxyl groups is 4 – 8.

* * * * *